United States Patent
Doty et al.

(10) Patent No.: US 8,853,651 B2
(45) Date of Patent: Oct. 7, 2014

(54) DOPED LUMINESCENT MATERIALS AND PARTICLE DISCRIMINATION USING SAME

(75) Inventors: F. Patrick Doty, Livermore, CA (US); Mark D. Allendorf, Pleasanton, CA (US); Patrick L. Feng, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 645 days.

(21) Appl. No.: 12/943,708

(22) Filed: Nov. 10, 2010

(65) Prior Publication Data

US 2011/0108738 A1    May 12, 2011

Related U.S. Application Data

(60) Provisional application No. 61/260,665, filed on Nov. 12, 2009, provisional application No. 61/347,501, filed on May 24, 2010, provisional application No. 61/392,321, filed on Oct. 12, 2010, provisional application No. 61/392,732, filed on Oct. 13, 2010.

(51) Int. Cl.
*G01J 1/58* (2006.01)
*G21K 4/00* (2006.01)
*C09K 11/06* (2006.01)

(52) U.S. Cl.
CPC . *C09K 11/06* (2013.01); *G21K 4/00* (2013.01); *C09K 2211/1029* (2013.01); *C09K 2211/185* (2013.01); *C09K 2211/1092* (2013.01); *C09K 2211/1074* (2013.01)
USPC ...................................................... 250/459.1

(58) Field of Classification Search
CPC .................................. G01J 1/58; C09K 11/06
USPC .................. 250/459.1, 458.1; 252/301.33
See application file for complete search history.

(56) References Cited

U.S. PATENT DOCUMENTS

| | | | |
|---|---|---|---|
| 5,134,293 A | 7/1992 | Anderson et al. | |
| 6,337,482 B1 | 1/2002 | Francke et al. | |
| 7,180,068 B1 | 2/2007 | Brecher et al. | |
| 7,462,897 B2 * | 12/2008 | Endo | 257/291 |
| 7,737,437 B2 * | 6/2010 | Yamazaki et al. | 257/40 |
| 8,263,971 B2 * | 9/2012 | Pieh | 257/40 |
| 2011/0049367 A1 * | 3/2011 | Forrest et al. | 250/338.4 |

FOREIGN PATENT DOCUMENTS

| | | |
|---|---|---|
| EP | 2 067 839 A1 | 6/2009 |
| JP | 11160444 | 6/1999 |
| JP | 2009046598 | 3/2009 |
| WO | WO 2009/117613 A1 | 9/2009 |
| WO | PCT/US2010/056258 | 5/2011 |

OTHER PUBLICATIONS

Campbell, I., et al., "Efficient plastic scintillators using phosphorescent dopants", Applied Physics Letters, 2007, v.90(12): pp. 12117-1-12117-3.

(Continued)

*Primary Examiner* — David Porta
*Assistant Examiner* — Faye Boosalis
(74) *Attorney, Agent, or Firm* — Dorsey & Whitney LLP

(57) ABSTRACT

Doped luminescent materials are provided for converting excited triplet states to radiative hybrid states. The doped materials may be used to conduct pulse shape discrimination (PSD) using luminescence generated by harvested excited triplet states. The doped materials may also be used to detect particles using spectral shape discrimination (SSD).

28 Claims, 14 Drawing Sheets

(56) References Cited

OTHER PUBLICATIONS

Doty, F. P., et al., "Use of Metal Organic Fluors for Spectral Discrimination of Neutrons and Gammas", Sandia Report, SAND: 2010-6724 Sep. 2010, 25 printed pages.
Doty, F.P., et al., "Scintillating Metal-Organic Frameworks: A New Class of Radiation Selection Materials", Advanced Materials, 2009, v.21(1): pp. 95-101.
Dyck, R., et al., "Ultraviolet spectra of stilbene, p-monohalogen stilbenes, and azobenzene and the trans to cis photoisomerization process", Journal of Chemical Physics, 1962, v.36(9): pp. 2326-2345.
Eddaoudi, M., et al., "Systematic Design of Pore Size and Functionality in Isoreticular MOFs and Their Application in Methane Storage" Science, 2002, v.294(5554): pp. 469-472.
Horrocks, D. "Pulse Shape Discrimination with Organic Liquid Scintillator Solutions", Applied Spectroscopy, 1970, v.24(4): pp. 397-404.
Klein, N., et al., Angewandte Chemie International Edition, 2009, v.48(52): pp. 9954-9957.
Laustriat, G., Molecular Crystals and Liquid Crystals, 1968, v.4(1-4): pp. 127-145.
Li, H., et al., "Organic light-emitting devices based on aromatic polyimide doped by electrophosphorescent material fac tris(2-phenylpyridine) iridium", Semiconductor Science and Technology, 2003, v.18(4): pp. 278-283.
Ockwig, N.W., et al., Accounts of Chemical Research, 2005, v.38(3): pp. 176-182.
Surble, S., et al., Chemical Communications, 2006, Issue 3: pp. 284-286.
Thompson, M., , "The evolution of organometallic complexes in organic light-emitting diodes", 2007, MRS Bulletin, v.32(9): pp. 694-701.
Tsuboi, T., et al., "Energy transfer between Ir(ppy)3 molecules in neat film and concentration quenching of phosphorescence", 2008, Optical Materials, v.30(9): pp. 1375-1381 Available Online at <www.sciencedirect.com>.
Yaghi, O.M., et al., Journal of the American Chemical Society, 1997, v.119(12): pp. 2861-2868.
Yaghi, O.M., et al., Nature, 2003, v.423(6941): pp. 705-714.
"EJ-301 Liquid Scintillator", Downloaded from website <http://www.eljentechnology.com>.
Ams, et al., "Control of stilbene conformation and fluorescence in self-assembled capsules", Beilstein Journal of Organic Chemistry; vol. 5, No. 79, 2009, 1-4.
Arulchakkaravarthi, et al., "Studies on microhardness and slip systems of Bridgman grown trans-stilbene crystals", Materials Letters—Journal vol. 51, 2001, 151-155.
Brooks, "A scintillation counter with neutron and gamma-ray discriminators", Nuclear Instruments and Methods in Physics; vol. 4, 1959, 151.
Brooks, "Development of organic scintillators", Nuclear Instruments and Methods in Physics; vol. 162, 1979, 477-505.
Budakovsky, et al., "New effective organic scintillators for fast neutron and short-range radiation detection", IEEE Transactions on Nuclear Science vol. 54, 2007, 2734-2740.
Campbell, I. et al., "Efficient plastic scintillators using phosphorescent dopants", Applied Physics Letters, No. 90, 2007, pp. 012117.
Czirr, et al., "Calibration and performance of a neutron-time-of-flight detector", Nuclear Instruments and Methods in Physics; vol. 31, 1964, 226-232.
Doty, F. P. et al., "Use of Metal Organic Fluors for Spectral Discrimination of Neutrons and Gammas", Sandia Report, SAND: 2010-6724, Sep. 2010, pp. 25.
Dyck, R. et al., "Ultraviolet spectra of stilbene, p-monohalogen stilbenes, and azobenzene and the trans to cis photoisomerization process", Journal of Chemical Physics, No. 36, 1962, pp. 2326.
Feng, et al., "Pulse-Shape Discrimination in High-Symmetry Organic Scintillators", IEEE Transactions on Nuclear Science; vol. 60, No. 4, Aug. 2013, 3142-3149.

Feng, et al., "Spectral- and Pulse-Shape Discrimination in Triplet-Harvesting Plastic Scintillators", IEEE Transactions on Nuclear Science; vol. 59, No. 6, Dec. 2012, 3312-3319.
Hull, et al., "New organic crystals for pulse shape discrimination", IEEE Transactions Nuclear Science; vol. 56, 2009, 899-903.
Karl, "Charge carrier transport in organic semiconductors", Synthetic Metals; vol. 133-134, 2003, 649-657.
Kaschuck, et al., "Fast neutron spectrometry with organic scintillators applied to magnetic fusion experiments", Nuclear Instruments and Methods in Physics Research; Section A, 2002, 511-515.
Kirkpatrick, "Percolation and Conduction", Reviews of Modern Physics vol. 45, No. 4, Oct. 1973, 574-588.
Lakowicz, et al., "Quenching of fluorescence by oxygen. A probe for structural fluctuations in macromolecules", Biochemistry; vol. 12, 1973, 4161-4170.
Lauck, et al., "Low-Afterglow, High-Refractive-Index Liquid Scintillators for Fast-Neutron Spectrometry and Imaging Applications", IEEE Transactions on Nuclear Science vol. 56, 2009, 989-993.
Li, H. et al., "Organic light-emitting devices based on aromatic polyimide doped by electrophosphorescent material fac tris(2-phenylpyridine) iridium", Semiconductor Science and Technology, No. 18, Feb. 2003, pp. 278-283.
Ortmann, et al., "Charge transport in organic crystals: Theory and Modelling", Physics Status Solidi; vol. 248, No. 3, 2011, 511-525.
Prakash, et al., "Creep of metal-type organic compounds-I pure polycrystals and particle-hardened systems", Acta Materialia—Journal, vol. 40, 1992, 3443-3449.
Reese, et al., "Isotropic transport in an oligothiophene derivative for single-crystal field-effect transistor applications", Applied Physics Letters; vol. 94, 2009, 202101-202103.
Rybakov, et al., "Fast-neutron spectroscopy", Consultants Bureau, Inc, 1960, 1-31.
Thompson, M., "The evolution of organometallic complexes in organic light-emitting diodes", MRS Bulletin, vol. 32, 2007, 694.
Tirsell, et al., "Sub-nanosecond plastic scintillator time response studies using laser produced X-ray pulsed excitation", IEEE Transactions on Nuclear Science vol. NS-24, 1977, 250-254.
Tsuboi, T. et al., "Energy transfer between Ir(ppy)$_3$ molecules in neat film and concentration quenching of phosphorescence", Optical Materials, No. 30; 2008, 1375-1381.
Valiev, et al., "NWChem: A comprehensive and scalable open-source solution for large scale molecular simulations", Computer Physics Communications vol. 181, 2010, 1477-1489.
Whittlestone, "The effect of pulse pile-up on discrimination between neutrons and gamma rays", Nuclear Instruments and Methods in Physics; vol. 173, 1980, 347-350.
Yamazaki, et al., "Picosecond Fluorescence Spectroscopy on Excimer Formation and Excitation Energy Transfer of Pyrene in Langmuir-Blodgett Monolayer Films", Journal of Physical Chemistry; vol. 91, 1987, 3572-3577.
Yanai, et al., "A new hybrid exchange-correlation functional using the Coulomb-attenuating method (CAM-B3LYP)", Chemical Physics Letters, vol. 393, 2004, 51-57.
Yeganeh, et al., "Triplet Excitation Energy Transfer with Constrained Density Functional Theory", Journal of Physical Chemistry; vol. 144, 2010, 20756-20763.
Zaitseva, et al., "Application of solution techniques for rapid growth of organic crystals", Journal of Crystal Growth; vol. 314, 2011, 163-170.
Zaitseva, et al., "Plastic scintillators with efficient neutron/gamma pulse shape discrimination", Nuclear Instruments and Methods in Physics Research A; vol. 668, 2012, 88-93.
Zaitseva, et al., "Pulse shape discrimination in impure and mixed single-crystal organic scintillators", IEEE Transactions on Nuclear Science; vol. 58, No. 6, 2011, 3411-3420.
Chen Fang-Chung et al., "High-performance polymer light-emitting diodes doped with a red phosphorescent iridium complex", Applied Physics Letters, American Institute of Physics, US, vol. 80, No. 13, Apr. 1, 2002, pp. 2308-2310.
European Search Report and European Search Opinion dated Jun. 26, 2014, for Application No. 10 83 0671.

* cited by examiner

DOPED LUMINESCENT MATERIALS AND PARTICLE DISCRIMINATION USING SAME

CROSS-REFERENCE TO RELATED APPLICATION(S)

This application claims the benefit of the earlier filing dates of U.S. Provisional Application 61/260,665, filed Nov. 12, 2009, U.S. Provisional Application 61/347,501, filed May 24, 2010, U.S. Provisional Application No. 61/392,321, filed Oct. 12, 2010, and U.S. Provisional Application No. 61/392,732, filed Oct. 13, 2010. All afore-mentioned provisional applications are hereby incorporated by reference, in their entirety, for any purpose.

STATEMENT REGARDING RESEARCH & DEVELOPMENT

Described examples were made with Government support under Government Contract No. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

TECHNICAL FIELD

Embodiments of the invention relate generally to particle detection. For example, embodiments relate to scintillators and methods for particle detection, including subatomic particle detection, including detection of ionizing radiation.

BACKGROUND

Luminescence refers to light emission caused by processes excluding incandescence, and including processes such as fluorescence, phosphorescence, chemiluminescence, bioluminescence, and electroluminescence. Luminescent materials are useful for sensors through modification of either transient or steady-state emission by an analyte. Scintillators, also referred to herein as "scintillating materials," comprise one class of luminescent sensor material, and generally refer to materials which emit prompt luminescence when exposed to ionizing radiation. When excited by ionizing radiation, electrons may be freed from atoms of the luminescent material. The electrons and molecular ions recombine to form neutral states, so-called 'singlet' and 'triplet' excitation states. Singlet excited states generally refer to states in which the excited electron is paired with a ground state electron, in that the excited and the ground state electron have an opposite spin. Triplet excited states generally refer to states in which the excited electron is not required to be paired with a ground state electron. Approximately 25% of the electrons excited by ionizing radiation in a scintillating material may relax to singlet excited states, while 75% of the excited electrons may go to a triplet state.

As the excited electrons relax to a ground state, they may emit luminescence. FIG. 1 is a schematic illustration of transitions experienced by excited electrons, as known in the art. Excited electrons occupying singlet states (S1 102) may generally freely relax to a ground state (S0 103), emitting luminescence 110. The luminescence 110 generated based on relaxing singlet states is generally considered 'fast' luminescence, occurring on the order of nanoseconds, and is based on the singlet state excited electron making a direct radiative transition to the ground state in the scintillating material. Excited electrons in triplet states (T1), such as T1 112 and 114 however, may not freely relax to a ground state. A transition from a triplet state to a ground state is 'spin-forbidden' according to the laws of physics. Instead, pairs of excited electrons in triplet states 112 and 114 may recombine with one another to generate an excited electron in a singlet state 116 and another 118 in a ground state. The excited electron in the singlet state 116 may then relax to a ground state S0 120 and generate luminescence 122. The triplet states accordingly often produce little or no luminescence, due to nonradiative transitions, or a slower luminescence, on the order of milliseconds or longer.

In some organic scintillating materials delayed singlet luminescence may be observed. The rate of this delayed luminescence is determined by the rate of diffusion of the triplet states to combining with one another within the scintillating material. Accordingly, the delayed luminescence may experience a non-exponential decay. Typically, only a small fraction (such as two percent) of excited electrons in triplet states may undergo this recombination and relaxation to produce luminescence.

The 'fast' and 'delayed' luminescence components described above may be exploited in scintillator systems to discriminate between exciting particles. For example, scintillating materials may be used to discriminate between energetic neutrons and gamma ray photons. These neutral particles must be converted to charged particles by the sensor material in order to be detected. Neutrons are observed based on their creation of recoil protons in the scintillating material, whereas gammas are converted to fast electrons, as understood in the art. Particle discrimination is possible in part because the 'fast' luminescence described above is generally dependent on the energy deposited per unit distance in the scintillating material, which is lesser for electrons than protons. FIG. 2 is a schematic illustration of the intensity of luminescence generated by ionizing electrons and recoil protons, respectively, over time. Luminescence generated by an electron is illustrated by line 202. Luminescence generated by a recoil proton is illustrated by line 204. As illustrated, an initial 'fast' luminescence intensity 210 may vary according to dE/dx, and therefore differ between the electron and recoil proton, with the electron producing a greater fast luminescence. However, the 'delayed' luminescence 212 generally does not vary by particle type. This effect may be used to differentiate signals from the different particle types, a technique referred to as pulse shape discrimination (PSD).

FIG. 3 is a schematic illustration of a scintillator system 310 configured to perform PSD. A photomultiplier tube (PMT) 304 is positioned to receive luminescence generated by a scintillating material 302. PMT 304 generally may convert the luminescence to an electronic signal. Electronics 306 may be coupled to the PMT 304 and receive the electronic signal generated by the PMT 304. The electronics 306 may be configured to detect particles and/or discriminate between particle types based on the temporal signature of the luminescence generated by the scintillating material 302.

Recall, as described above, generally few excited electrons in triplet states in the scintillating material relax to generate luminescence. Rather, a greater number of singlet state electrons relax and generate luminescence. The heavy-atom effect has been used to increase the availability of transfer states for excited triplet states. Briefly, the heavy atom effect refers to an effect whereby the presence of a heavy atom accelerates the transition of excited triplet states to a ground state. The heavy-atom effect has been used, for example, to identify the triplet absorption state in stilbene. See Dyck, R. H. et al., "Ultraviolet spectra of stilbene, p-monohalogen stilbenes, and azobenzene and the trans to cis photoisomerization process," *Journal of Chemical Physics,* 36, p. 2326 (1962), which article is hereby incorporated by reference in its entirety for any purpose. Further, the heavy atom effect has been used to create fast-emitting phosphors for organic light-emitting diodes. See Thompson, M. "The evolution of organometallic complexes in organic light-emitting diodes," *MRS Bulletin,* 32, p. 694 (2007), which article is hereby incorporated by reference in its entirety for any purpose. Further, the heavy-atom effect has also been shown to increase light yield in plastic scintillators. See I. H. Campbell, et. al., "Efficient plastic scintillators using phosphorescent dopants," *Applied Physics Letters,* 90, p. 012117 (2007), which article is hereby incorporated by reference in its entirety for any purpose.

SUMMARY

Examples described herein include methods of making a material for particle detection. An example method may include providing a host material. The host material may be configured to generate excited singlet and triplet states responsive to excitation. The method may further include doping the host material with a quantity of heavy atoms. The quantity of heavy atoms may be configured to generate luminescence from at least a portion of the excited triplet states. The quantity may be sufficient to generate detectable luminescence from the excited triplet states, and insufficient to quench substantially all luminescence from the excited singlet states.

Examples described herein also include materials for particle detection. An example material may include a host material and a first luminophore dispersed in the host material. The first luminophore may be configured to generate luminescence at a first wavelength responsive to excited singlet states. A second luminophore may also be dispersed in the host material. The second luminophore may be configured to generate luminescence at a second wavelength, different from the first wavelength, responsive to excited triplet states. A quantity of the second luminophore may be insufficient to quench substantially all luminescence at the first wavelength.

Examples described herein include methods for detecting a particle. An example method may include exciting a material with the particle. The material may be configured to generate excited singlet and triplet states responsive to excitation by the particle. The material may includes a luminophore configured to harvest luminescence from excited triplet states. The method may include measuring a temporal luminescence response generated by the material including a magnitude of luminescence at a plurality of times. The method may include detecting the particle, based at least in part, on the temporal response.

Another example method for detecting a particle may include exciting a material with the particle. The material may be configured to generate states responsive to excitation by the particle. The material may includes luminophore configured to facilitate luminescence from excited triplet states responsive to exposure to the excited triplet states in the material. The method may include measuring a wavelength spectral signature of luminescence generated by the material including a magnitude of luminescence at a plurality of wavelengths. The method may further include detecting the particle, based at least in part, on the wavelength spectral signature.

Examples of systems are described herein. An example system may include a material. The material may be configured to generate excited singlet and triplet states responsive to excitation by a particle. The material may include a luminophore configured to luminescence responsive to exposure to excited triplet states in the material. The material may be further configured to generate luminescence from the excited singlet states at a first wavelength, and to generate luminescence from the excited triplet states at a second wavelength, different from the first wavelength. The system may include a first luminescence detector configured to receive at least a portion of luminescence generated by the material and further configured to generate a first signal corresponding to a magnitude of luminescence at the first wavelength. The system may include a second luminescence detector configured to receive at least a portion of luminescence generated by the material and further configured to generate a second signal corresponding to a magnitude of luminescence at the second wavelength.

DETAILED DESCRIPTION

Figure 1:
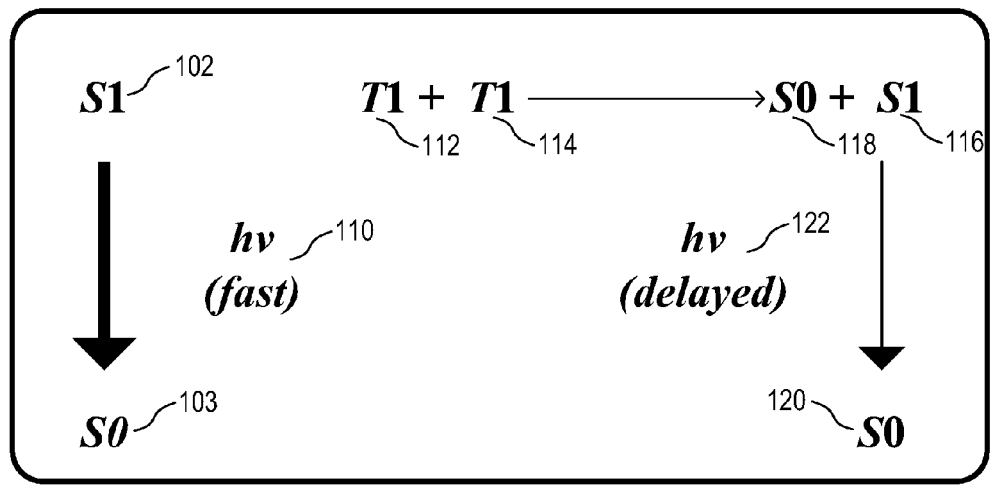
FIG. 1 is a schematic illustration of transitions experienced by excited electrons, as known in the art.
Figure 2:
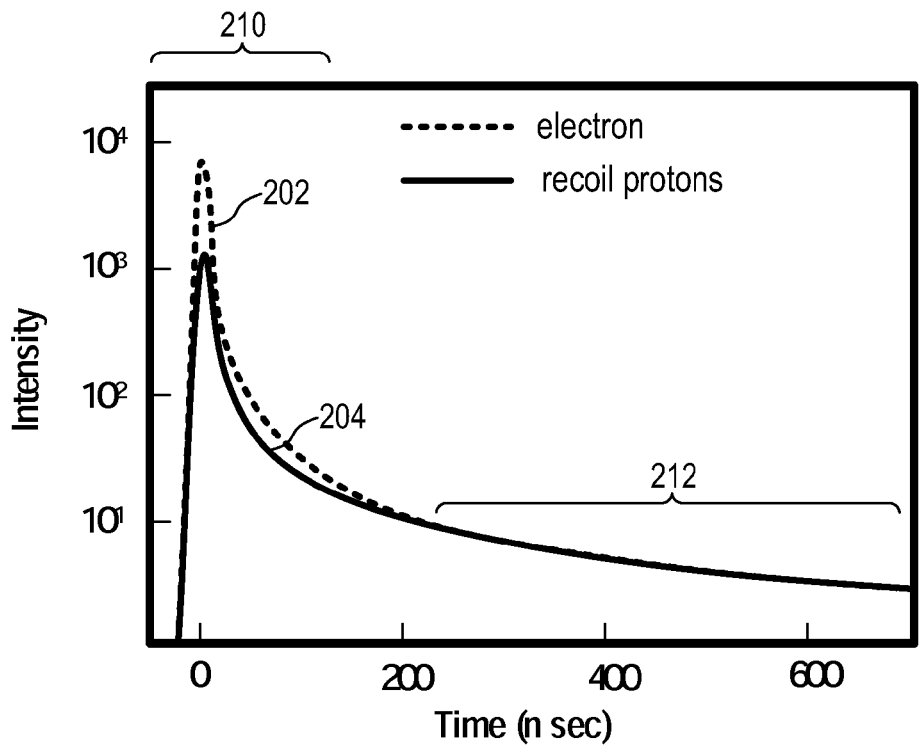
FIG. 2 is a schematic illustration of the intensity of luminescence generated by electrons and recoil protons, respectively, over time.
Figure 3:
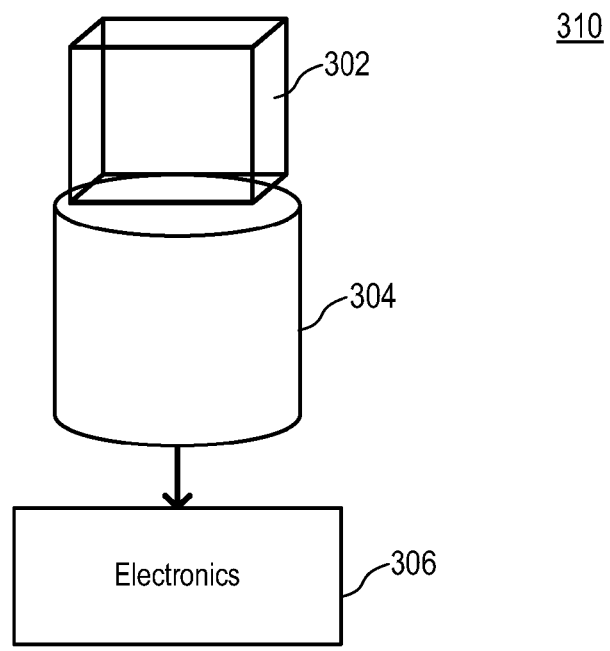
FIG. 3 is a schematic illustration of a scintillator system configured to perform pulse shape discrimination (PSD).

Certain details are set forth below to provide a sufficient understanding of embodiments of the invention. However, it will be clear to one skilled in the art that embodiments of the invention may be practiced without various of these particular details. In some instances, well-known chemical structures, chemical components, molecules, materials, electronic components, circuits, control signals, timing protocols, and software operations have not been shown in detail in order to avoid unnecessarily obscuring the described embodiments of the invention. Further, examples may be described below in the context of subatomic particle detection and/or discrimination, such as between electrons and protons and/or neutrons. Embodiments of the invention, however, may be used to detect other analytes, such as but not limited to oxygen, in an analogous manner.

Embodiments of the present invention include host materials doped with a luminophore which may convert excitation energy into delayed luminescence. The luminophore may be implemented, for example, as a heavy metal atom complexed with an organic ligand. Accordingly, the luminophore may enhance luminescence harvesting from triplet states in some examples. The luminophore may allow for a portion of the luminescence generated by the doped material to be independent of the host material, accordingly, independent control of wavelength and/or decay time may be achieved in some examples. Examples of host materials described herein, may however, still include both a 'fast' and a 'delayed' luminescence portion. Accordingly, examples of doped materials according to the present invention may be used to perform conventional pulse shape discrimination (PSD), and may enhance the efficacy of the pulse shape discrimination in some examples. Moreover, examples of doped materials described herein may be used for spectral shape discrimination (SSD). In spectral shape discrimination, particles may be detected and/or discriminated based on a luminescence response over wavelength instead of or in addition to time.

The 'fast' and 'slow' luminescence described herein may be generated in a variety of ways. Doped materials described herein may include at least two types of luminophore—one configured to harvest luminescence from triplet states and another configured to emit luminescence from singlet states, for example. Either luminophore may be intrinsic to the host material while the other is an extrinsic dopant. In several embodiments, a heavy atom dopant is introduced to a host material for harvesting triplet states. However, some embodiments described below may include a heavy atom in the host material, such as a metal organic framework material, and a luminophore for singlet emission may be brought in as a dopant. In some embodiments, both luminophores may be extrinsic to the host material, such as a plastic host material doped with both a fluorescent dye or other luminophore for singlet emission and a heavy atom for triplet harvesting.

Embodiments of the present invention accordingly include doped host materials. Any of a variety of host materials may be doped in accordance with embodiments of the present invention including, for example, metal-organic framework, plastic, crystalline, and liquid materials. In some examples, the host material may be a scintillating material.

Metal-organic framework materials have been described, for example, at F. P. Doty, et. al., "Scintillating Metal Organic Frameworks: A New Class of Radiation Detection Materials," *Advanced Materials*, 21, p. 95 (2009), which article is hereby incorporated by reference in its entirety for any purpose. Metal-organic framework materials are crystalline materials having metal clusters connected with linkers. Metal-organic framework materials may be scintillating or not scintillating. The resultant crystalline structure defines cavities of variable geometry and size. The metal clusters may be formed using any of a variety of transition metals and/or lanthanides. Any of a variety of linkers may be used including 1) carboxylic acids, including di-, tri-, and tetra-carboxylic acids, 2) N-donors, such as but not limited to imidazole or bipyridine, or 3) metal complexes. The defined cavities may be of variable geometry and size, and generally may have a dimension of up to 4 nm. The defined cavities may advantageously allow for dopant incorporation.

Suitable plastic materials for use as a host material include, but are not limited to, polyvinylcarbazole (PVK). Other plastic materials may be used. Well known examples include polyvinyltoluene (PVT) and polystyrene. Some embodiments of non-luminescent host materials may be doped both with heavy atoms as described further below and with, for example, a fluorescent dye or other luminescent moiety capable of accepting energy from the host to facilitate emission from singlet states as well as triplet states.

Liquid host materials include, but are not limited to, mineral oil-based scintillators including 1,4-bis(5-phenyloxazol-2-yl) benzene (POPOP) or polyphenylene oxide (PPO). Other liquid luminescent materials may be used.

Figure 4:
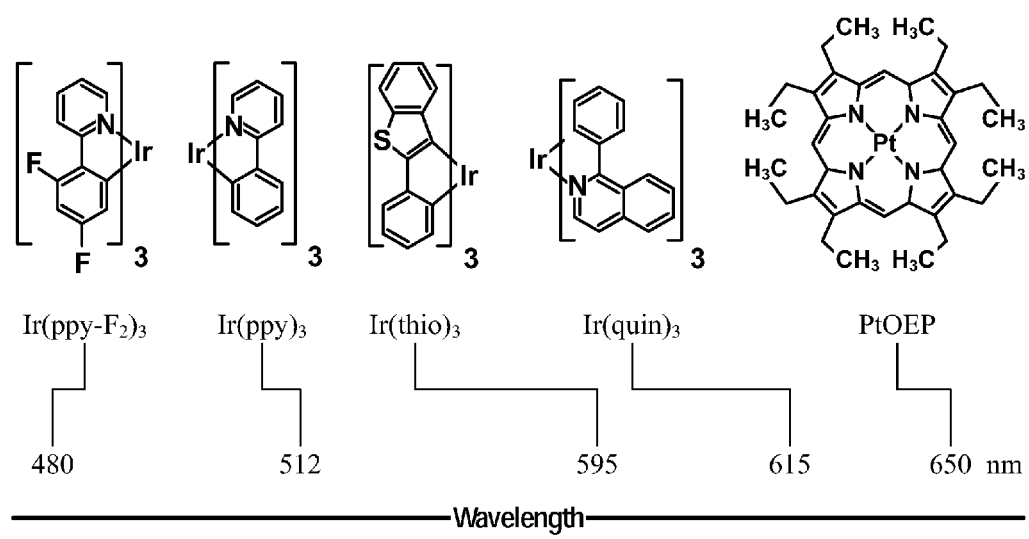
FIG. 4 is a schematic illustration of examples of heavy atom complexes suitable for use in materials described herein, together with approximate wavelengths at which the dopants may generate emissions.

Host materials according to embodiments of the present invention may be doped with an extrinsic dopant adapted to harvest excited triplet states. In some examples, the dopant may not be extrinsic. Generally, dopant refers to a luminophore integrated into a host material at a fraction of potential sites, while other potential sites are either occupied by non-luminescent components or are vacant. The dopant may include a heavy atom. Generally, a heavy atom refers to a metal or other atom exhibiting the heavy-atom effect enhancing transitions from excited triplet states. Examples include third-row transition metals such as iridium, osmium, and platinum. Other examples include halides or lanthanides. Other examples include halogens which may exhibit the heavy atom effect, such as chlorine. In some examples, a heavy atom may be introduced to the host material as a complex with an organic ligand. The heavy atom may or may not interact with the host material. Generally, the heavy atom may be dispersed in the host material, such as by mixing. Doping may also be achieved through direct coordination with the host, covalent bonding to the host, or combinations thereof. FIG. 4 is a schematic illustration of examples of heavy atom complexes suitable for use in materials described herein, together with approximate wavelengths at which the dopants may generate emissions responsive to excitation particles. The complexes shown in FIG. 4 include an iridium or platinum atom. Other organic ligands and heavy atoms may also be used.

The complexes shown in FIG. 4 include Ir(ppy-$F_2$)$_3$, which represents a complex including Tris[2-(4,6-difluorophenyl) pyridinato-C2,N]iridium(III). The metal organic phosphor Ir(ppy-$F_2$)$_3$ may generate emissions having a wavelength of 480 nm. Another complex which may be used is Ir(ppy)$_3$, which represents a complex including Tris[2-phenylpyridinato-C2,N]iridium(III). Ir(ppy)$_3$ may generate emissions having a wavelength of 512 nm. Another complex which may be used is Ir(thio)$_3$, which represents a complex including Tris[2-(benzo[b]thiophen-2-yl)pyridinato-C3,N]iridium (III). Ir(thio)$_3$ may generate emissions having a wavelength of 595 nm. Another complex which may be used is Ir(quin)$_3$, which represents a complex including Tris[1-phenylisoquinoline-C2,N]iridium(III). Ir(quin)$_3$ may generate emissions having a wavelength of 615 nm. Another complex which may be used is PtOEP, which represents a complex including platinum octaethylporphyrin. PtOEP may generate emissions at a wavelength of 650 nm. The complexes shown in FIG. 4 may be commercially available, such as from Sigma-Aldrich, Inc. Other complexes may be used, and combinations of complexes may be used.

Luminophores described above have generally been described as extrinsic dopants for harvesting excited triplet states. In some examples of MOFs, however, a triplet-emitter may be incorporated as part of the host material itself. In such an embodiment, the host material MOF including triplet-emitters may instead be infiltrated with an extrinsic dopant adapted for singlet emission. Such "inside out" examples of doped host materials, where the dopant is adapted for singlet emission, may provide certain advantages in some embodiments. For example, incorporating the phosphor for triplet emission into the host material itself may protect and stabilize desired luminescence when phosphorescence may otherwise be quenched under ambient conditions. In some examples, the heavy atom effect may be sensitive to structural distortions, and a rigid host may improve spin-orbit coupling by reinforcing the fluor structure. Further, "inside out" systems may be advantageous for using lanthanide heavy atoms. Lanthanide series may exhibit different luminescent properties, but similar ionic radii, allowing lanthanide frameworks to be doped with dissimilar luminescent states. Lanthanide dopants may be lower in cost than platinum group metal systems.

Dopants may be incorporated into host materials using a variety of techniques. Solvent infiltration, using a solvent containing the dopant, may be used to incorporate extrinsic dopants into porous crystalline materials such as MOFs. Vapor infiltration may also be used. So-called "ship-in-bottle" synthesis may be used to incorporate extrinsic dopants into crystalline host materials such as MOFs. The MOF may be synthesized around the metal organic ligand complex. Ship-in-bottle synthesis may be advantageous for crystalline materials such as MOFs having a relatively large pore volume, but small pore apertures.

Examples of host materials and metal organic ligand complexes according to the present invention are now described, along with synthesis techniques. Other combinations may also be used.

An MOF IRMOF-10 may be doped with Ir(ppy)$_3$, Ir(ppy-F2)$_3$, Ir(quin)$_3$, Ir(thio)$_3$, PtOEP, or combinations thereof. IRMOF-10 refers to an isoreticular MOF conforming to $Zn_4O-L_3$ where L=4,4'-biphenyldicarboxylate. The IRMOF-10 may be doped using solvent infiltration into the evacuated MOF. In one example, IRMOF-10 was prepared by dissolving zinc nitrate hexahydrate, $Zn(NO_3)_2 \cdot 6H_2O$ (0.186 g, 0.625 mmol) and 4,4'-biphenyldicarboxylic acid, 4,4'-BPDCH$_2$ (0.03 g, 0.124 mmol) in 50 mL of N,N-diethylformamide within a glass bottle. The vessel was sealed and heated at a constant rate (1.5° C./min) to 85° C. for 15 hours and then cooled to ambient temperature at a rate of 2° C./min. The resultant sample (48%) was washed with N,N-dimethylformamide (3×15 mL), followed by chloroform (3×15 mL). The crystals were then evacuated for 3 hours at 50 mTorr, transferred to a N$_2$ glovebox, and mixed with a choloroform solution (5 mL) of Ir(ppy)$_3$ (0.8 mg, 1.22·10$^{-3}$ mmol), Ir(quin)$_3$ (1.1 mg, 1.37·10$^{-3}$ mmol), or Pt(OEP) (1.0 mg, 1.37·10$^{-3}$ mmol). After 8 hours, the infiltrated crystals were washed with fresh chloroform (5×15 mL). ICP-OES on the above (IRMOF-10+Ir(ppy)$_3$) preparation indicated an Iridium metal loading ratio of 0.99% (w/w). Other preparation techniques may be used.

Another MOF which may be used is referred to as Dresden University of Technology #6 (DUT-6): $Zn_4O(2,6\text{-}NDC)$ (benzenetribenzoate)$_{4/3}$(DEF)$_{16}$(H$_2$O)$_{9/2}$. DUT-6 is described, for example, at Klein, N., eta, Chem. Int. Ed., 48, 9954 (2009), which article is hereby incorporated by reference in its entirety for any purpose. DUT-6 may be doped with Ir(quin)$_3$ or Ir(thio)$_3$ or combinations thereof. The DUT-6 may be doped using ship-in bottle synthesis. An example of one formation and doping process using DUT-6 is provided for ease of understanding. DUT-6 was prepared via a procedure similar to the previously reported method described, for example, in Eddaoudi, et. al., Science, 294, 462 (2002), which article is incorporated herein by reference in its entirety for any purpose. O$_2$ was removed from the reaction mixture, and a lower temperature was used. In-situ 'ship-in-bottle' incorporation of iridium or platinum heavy-metal complexes was performed. Fluorescent 2,6-naphthalenedicarboxylic acid (NDC) (0.034 g, 0.16 mmol) and 1,3,5-tris(4-carboxyphenyl)benzene (0.108 g, 0.246 mmol) were dissolved in N,N-diethylformamide (20 mL) and mixed with a DEF solution (2 mL) of zinc nitrate hexahydrate, $Zn(NO_3)_2 \cdot 6H_2O$ (0.117 g, 0.393 mmol). Ir(thio)$_3$ (1.1 mg, 1.34·10$^{-3}$ mmol), Ir(quin)$_3$ (1.1 mg, 1.37·10$^{-3}$ mmol), or Pt(OEP) (1.0 mg, 1.37·10$^{-3}$ mmol)) were added, followed by rigorous O$_2$-degassing using N$_2$. The sample bottle was then sealed and heated to 80° C. for 10 hours, resulting in respective yellow, orange, or red colored octahedral crystals (1 mm×1 mm×1 mm) of infiltrated DUT-6. The crystals were washed with p-Xylenes (3×15 mL) or chloroform (3×15 mL) and soaked overnight to remove surface impurities. No luminescence was observed in the final soak solutions, indicating no diffusion of the infiltrated molecules out of the MOF pores. The loading ratios may also be varied by changing the initial concentration of phosphorescent Iridium or Platinum complexes in the reaction mixture, as evidenced by smooth variations of the relative peak intensities in the photoluminescence emission spectra Another MOF which may be used is referred to as MOF-4. MOF-4 may have no intrinsic luminescence, and may first be doped with naphthalenedicarboxylic acid molecules or other luminescence groups. The resulting combination may be doped with Ir(quin)$_3$ or Ir(thio)$_3$ or combinations thereof. MOF-4 may be prepared via a procedure similar to a previously reported method, described for example at Yaghi, O. M. et al., J. Am. Chem. Soc. 119, 2861 (1997), which article is hereby incorporated by reference in its entirety for any purpose. A fluorescent guest molecule may be added, such as 1,4-naphthalenedicarboxylic acid or 4,4'-stilbenedicarboxylic acid, and O$_2$ may be rigorously removed from the reaction mixture. Additionally, phosphorescent iridium or platinum heavy-metal complexes may be added. In a representative synthesis, 1,4-naphthalenedicarboxylic acid (0.034 g, 0.160 mmol) and trimesic acid (0.035 g, 0.167 mmol) were dissolved in 4 mL of N,N-diethylformamide and added to a DEF (2 mL) solution of zinc nitrate hexahydrate, $Zn(NO_3)_2 \cdot 6H_2O$ (0.256 g, 0.860 mmol) and Ir(ppy)$_3$ (0.8 mg, 1.22·10$^{-3}$ mmol), Ir(ppy-F$_2$)$_3$ (1.0 mg, 1.31·10$^{-3}$ mmol), Ir(thio)$_3$ (1.1 mg, 1.34·10$^{-3}$ mmol), Ir(quin)$_3$ (1.1 mg, 1.37·10$^{-3}$ mmol), or Pt(OEP) (1.0 mg, 1.37·10$^{-3}$ mmol)). The mixture was rigorously O$_2$-degassed using N$_2$ and heated to 80° C. for 10 hours, resulting in colored clear polyhedral crystals (1 mm×0.8 mm×0.8 mm) of infiltrated MOF-4. The crystals were washed with p-Xylenes (3×15 mL) or chloroform (3×15 mL) and soaked overnight to remove surface impurities. No luminescence was observed in the final soak solutions, indicating no diffusion of the infiltrated molecules out of the MOF pores. The loading ratios may also be varied by changing the initial concentration of phosphorescent Iridium or Platinum complexes in the reaction mixture, as evidenced by smooth variations of the relative peak intensities in the photoluminescence emission spectra. The incorporation of fluorescent guest molecules in the MOF-4 pores was performed to render the non-emissive crystalline framework luminescent, and was accomplished by direct ship-in-bottle addition of the organic fluors and phosphorescent metal complexes to the reaction mixture.

An MOF RHT-1 may be doped with $Ir(ppy)_3$, $Ir(quin)_3$, $Ir(thio)_3$, PtOEP, or combinations thereof. RHT refers to MOFs comprising rhombicuboctahedral, tetrahedral, and cuboctahedral cages. Examples of plastic PVK may be doped with $Ir(ppy)_3$, Ir $(ppy-F2)_3$, $Ir(quin)_3$, $Ir(thio)_3$, PtOEP, or combinations thereof. Example concentrations include 0.01% or 0.026% $Ir(ppy)_3$, 0.026% Ir $(ppy-F2)_3$, 0.026% $Ir(quin)_3$, 0.026% $Ir(thio)_3$, or 0.05% PtOEP. To prevent complete transfer of singlet to MLCT excitation by intersystem crossing, concentrations below 1% by weight may be required, in some embodiments, below 0.5% by weight, in some examples below 0.25% by weight, in some examples below 0.1% by weight, in some examples below 0.06% by weight, in some examples below 0.03% by weight, in some examples below 0.1% by weight. In one example, initial PVK samples were prepared by drop casting from chlorobenzene solutions onto microscope slides. Two stock solutions were prepared, containing 1) low-molecular weight Poly(9-vinylcarbazole) obtained from Sigma-Aldrich, and 2) low concentrations of $Ir(ppy)_3$. Small portions of the metal-organic solution were added to ten ml aliquots of the polymer solution for drop-casting. Bulk iridium and platinum doped plastic scintillators were also prepared via in-situ polymerization of the monomer components or through dissolution. Polymerization was accomplished according to established methods, employing AIBN as a radical initiator.

Examples of oil-based liquid host materials may incorporate $Ir(quin)_3$. One example of a suitable oil-based liquid scintillator mixture includes 5 mg POPOP, 20 mL Mineral Oil, 0.4 mg $Ir(quin)_3$, and 2 mL $CHCl_3$. The quantities are exemplary only. Another example of a suitable oil-based liquid scintillator mixture includes 10 mg PPO, 20 mL Mineral Oil, 0.4 mg $Ir(quin)_3$, and 1 mL $CHCl_3$. In one example, 2,5-diphenyloxazole (PPO), (10 mg, 0.045 mmol) and $Ir(quin)_3$ (0.4 mg, mmol) were dissolved in 1 mL $CHCl_3$ and subsequently added to 20 mL of mineral oil. The mixture was then rigorously degassed using $N_2$ to remove dissolved $O_2$. Alternate mixtures containing other heavy-metal phosphors, or differing primary or secondary fluor combinations, may be used. The phosphors include but are not limited to $Ir(ppy)_3$, $Ir(ppy-F2)_3$, $Ir(quin)_3$, $Ir(thio)_3$, and Pt(OEP). Primary or secondary fluors include but are not limited to p-terphenyl, PPO, POPOP, anthracene, naphthalene, diphenylanthracene, and trans-stilbene.

By way of summary, Table 1 below provides examples of host materials which have been demonstrated including luminophores according to embodiments of the present invention.

TABLE 1

Demonstrated compositions

Plastic-based materials

1. PVK + 0.010% $Ir(ppy)_3$ (SSD verified via steady-state CL and IBIL)
2. PVK + 0.026% $Ir(ppy)_3$ (SSD verified via steady-state CL and IBIL)
3. PVK + 0.026% $Ir(ppy-F2)_3$ TABLE 1-continued Demonstrated compositions 4. PVK + 0.026% $Ir(quin)_3$
5. PVK + 0.026% $Ir(thio)_3$
6. PVK + 0.050% PtOEP MOF-Based Materials
Category 1: DUT-6. (Synthesized via ship-in-bottle synthesis: intact truncated octahedral crystals.)

1. DUT-6 w/$Ir(quin)_3$.
2. DUT-6 w/$Ir(thio)_3$

Category 2: IRMOF-10. (Synthesized via solvent infiltration into evacuated MOF: opaque cubic crystals)

1. IRMOF-10 w/$Ir(ppy)_3$ (ICP analysis reveals 0.99% Iridium by weight)
2. IRMOF-10 w/$Ir(ppy-F2)_3$
3. IRMOF-10 w/$Ir(quin)_3$ (SSD verified via steady-state CL and IBIL)
4. IRMOF-10 w/$Ir(thio)_3$ (SSD verified via steady-state CL and IBIL)
5. IRMOF-10 w/PtOEP Category 3: MOF-4 (Synthesized via ship-in-bottle synthesis: intact truncated octahedral crystals.) [Note: the MOF framework may have no intrinsic luminescence; fluorescence may be imparted by guest naphthalenedicarboxylic acid molecules (or other luminescent groups)]

1. MOF-4 w/1,4-naphthalenedicarboxylic acid (primary singlet fluor) + $Ir(quin)_3$.
2. MOF-4 w/1,4-naphthalenedicarboxylic acid (primary singlet fluor) + $Ir(thio)_3$.

Category 4: RHT-1. (Synthesized via ship-in-bottle and solvent infiltration into evacuated MOF: intact octahedral crystals and opaque octahedra, respectively)

1. RHT-1 w/$Ir(ppy)_3$.
2. RHT-1 w/$Ir(thio)_3$.
3. RHT-1 w/$Ir(quin)_3$.
4. RHT-1 w/PtOEP Oil-based Liquid Scintillator 1. 5 mg POPOP + 20 mL Mineral Oil + 0.4 mg $Ir(quin)_3$ + 2 mL $CHCl_3$
2. 10 mg PPO + 20 mL Mineral Oil + 0.4 mg $Ir(quin)_3$ + 1 mL $CHCl_3$ In embodiments of the present invention, the identity and quantity of the luminophore used to harvest luminescence from triplet states may be selected such that there is sufficient dopant to generate detectable luminescence from the excited triplet states, but insufficient dopant to quench substantially all luminescence from the excited singlet states. That is, doped host materials according to embodiments of the present invention may continue to produce a "fast" luminescence related to the relaxation of singlet states and "delayed" luminescence at a time, wavelength, and intensity that may be controlled by the identity and quantity of the luminophore.

Dopant concentrations and energy levels may be optimized to increase luminescence intensity over the 25% spin multiplicity limit for singlet (prompt) emission, via heavy-atom mediated conversion of non-luminescent triplet excitons to a luminescent charge transfer state, while avoiding conversion of the singlet excitations. Optimized concentrations may be determined, in part, by the electronic exchange overlap integral, or Dexter exchange, between the nonemissive and emissive triplet states. Larger electronic exchange allows for more efficient triplet energy conversion between states, resulting in lower required doping levels to achieve comparable prompt and delayed luminescence intensities. Optimal dopant concentrations may also be determined with reference to the relative quantum efficiencies of the fluorescent host and charge transfer species, respectively.

In some embodiments, additional dopants may be used. For example, materials may include a wavelength-shifting fluor. The wavelength-shifting fluor may be used to convert the luminescence generated from both singlet and triplet states to luminescence at a same wavelength. This may be advantageous in materials having a relatively long optical path to reduce or eliminate re-absorption of the luminescence within the host material.

Doped host materials according to embodiments of the present invention may accordingly produce fluorescence from triplet states as well as singlet states. Intrinsic and extrinsic luminescence may occur at different wavelengths. Some example spectra will now be described.

Figure 5:
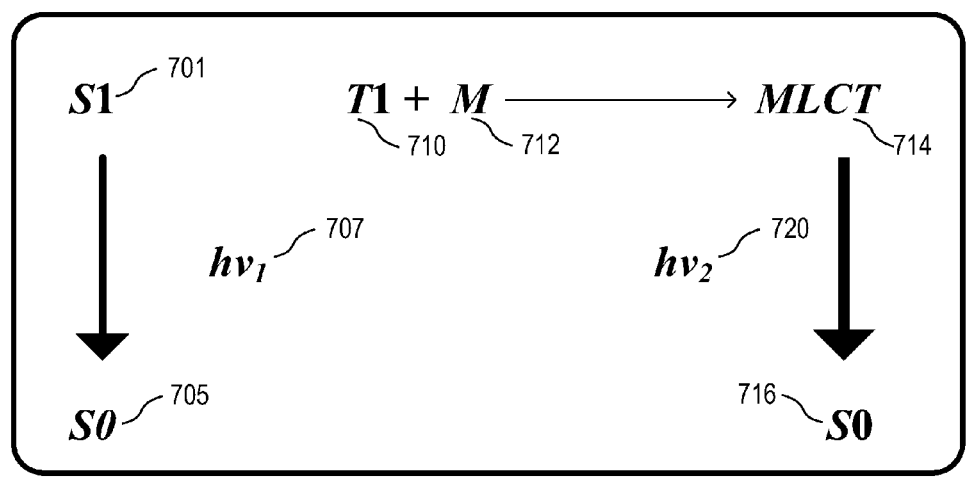
FIG. 5 is a schematic illustration of transitions experienced by excited electrons in accordance with embodiments of the present invention.

FIG. 5 is a schematic illustration of transitions experienced by excited electrons in accordance with embodiments of the present invention. Excited singlets, represented by S1 701 may relax to a ground state S0 705, producing luminescence 707 at a first wavelength, represented by $v_1$. Excited triplet states, represented by T1 710 may encounter an extrinsic dopant, such as a heavy metal atom or complex M 712 and form a metal-to-ligand charge transfer state (MLCT) 714. The MLCT may relax to a ground state S0 716, producing luminescence 720. The luminescence 720 may occur at a second wavelength, denoted $v_2$, which may be different than the first wavelength $v_1$. The luminescence 707 may again be "fast" luminescence, occurring on the order of nanoseconds, while the luminescence 720 may be "delayed" luminescence, occurring on the order of microseconds.

The timing and intensity of the luminescence 707 may accordingly depend on the energy per distance deposited by a particle, as well as the host material. The timing and intensity of the luminescence 720 may depend on the characteristics of the extrinsic dopant and may in some embodiments be independent of the exciting particle and scintillation material. Accordingly, embodiments of the present invention may detect particles (including discriminating between particles in some examples) based on a temporal spectrum of luminescence or an emission spectrum of luminescence, or combinations thereof.

In some embodiments, the "delayed" luminescence, such as the luminescence 720 may decay exponentially. Recall that using conventional scintillating materials, described above, the decay of the delayed luminescence due to excited triplet recombination is not exponential, but rather dependent on triplet diffusion characteristics. Use of doped host materials according to examples of the present invention accordingly may produce a faster decaying "delayed" luminescence. This may advantageously increase a speed of detection according to embodiments of the present invention, because background luminescence may not accumulate due to the faster decay.

Figure 6:
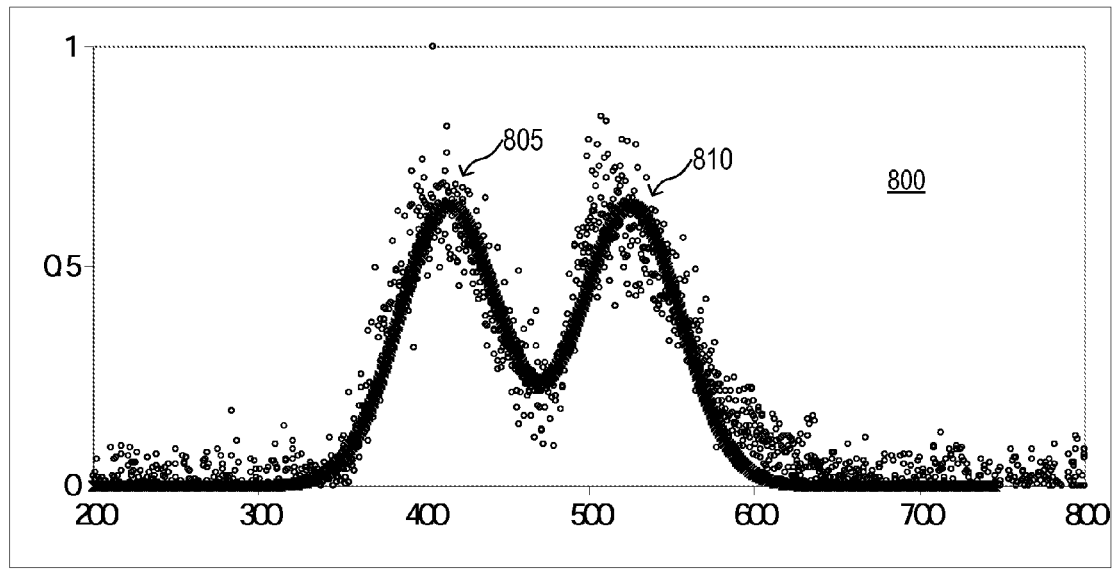
FIG. 6 is an emission spectrum from fast electron excitation of a doped host material according to an embodiment of the present invention.

FIG. 6 is an emission spectrum from fast electron excitation of a doped host material according to an embodiment of the present invention. The spectrum shown in the example of FIG. 6 was taken from a PVK host material doped with 0.026% IrL$_3$. The emission spectrum 800 includes a first peak 805 corresponding to luminescence from singlet states. The first peak 805 occurs at a wavelength corresponding to blue light, at around 400 nm. The second peak 810 corresponds to luminescence from MLCT states. The second peak 810 occurs at a wavelength corresponding to green light, at around 520 nm. Although shown plotted against wavelength in FIG. 8, recall the first and second peaks may also occur at different times, as was generally described above.

Figure 7:
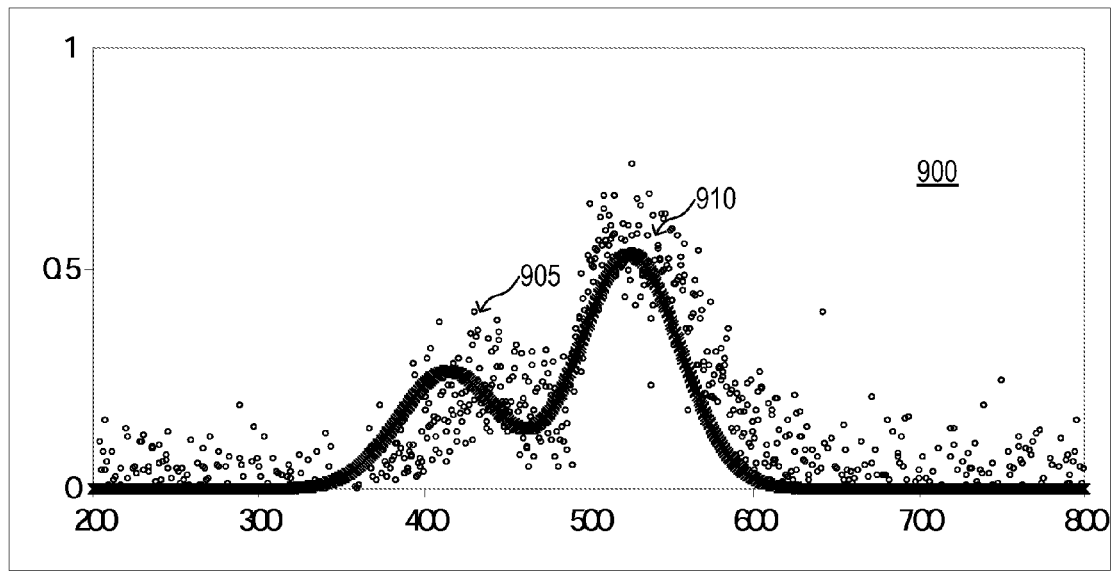
FIG. 7 is an emission spectrum from fast proton excitation of a doped host material according to an embodiment of the present invention.

FIG. 7 is an emission spectrum from fast proton excitation of a doped host material according to an embodiment of the present invention. The spectrum shown in the example of FIG. 7 was taken from a PVK host material doped with 0.026% IrL$_3$. The emission spectrum 900 includes a first peak 905 corresponding to luminescence from singlet states. The first peak 905 occurs at a wavelength corresponding to blue light, at around 400 nm. The second peak 910 corresponds to luminescence from MLCT states. The second peak 910 occurs at a wavelength corresponding to green light, at around 520 nm. Although shown plotted against wavelength in FIG. 7, recall the first and second peaks may also occur at different times, as was generally described above. Note that the first peak 905 in FIG. 7, the fast proton excitation spectrum, is less intense than the first peak 805 in FIG. 6, the fast electron excitation spectrum. In this manner, an emission spectrum may be used to detect a proton or electron as an excitation species. Alternatively or in addition, pulse shape discrimination using a temporal spectrum as described above may be implemented using embodiments of the doped host materials described herein. The doped host materials described herein may advantageously increase the "delayed" luminescence, and may accordingly enhance PSD.

Figure 8:
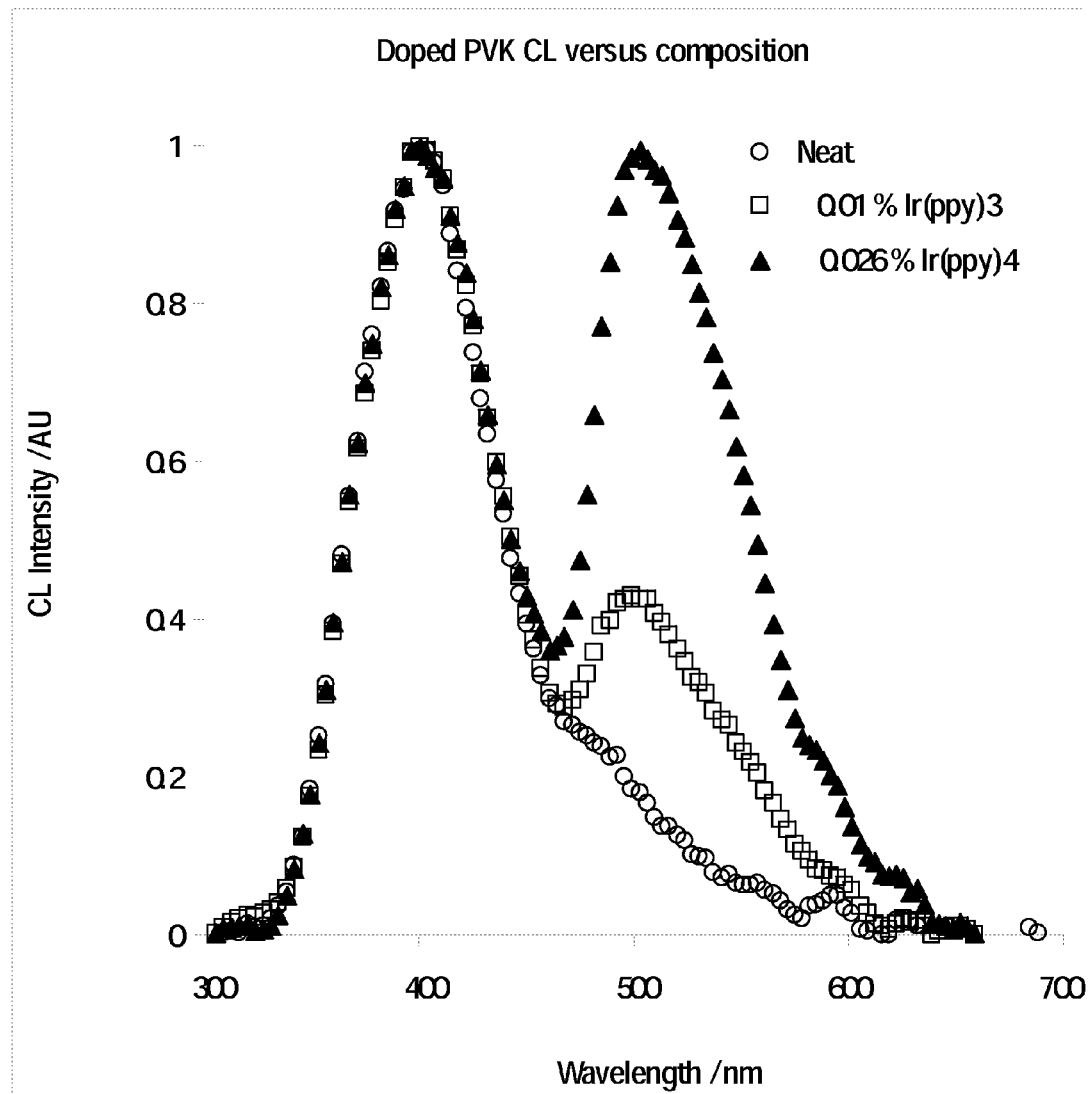
FIG. 8 is an example plot of cathodoluminescence (CL) of undoped PVK, as well as PVK films doped with 0.01 and 0.026 weight percent Ir(ppy)$_3$.

Some further example spectra are included for ease in understanding embodiments of the present invention. FIG. 8 is an example plot of cathodoluminescence (CL) of undoped PVK, as well as PVK films doped with 0.01 and 0.026 weight percent Ir(ppy)$_3$. The spectra were acquired for 30 seconds under nearly identical beam conditions of 10 kV accelerating voltage and 182-190 pA probe current. The relative intensities of intrinsic blue (410 nm) and extrinsic green (520 nm) luminescence indicate a two-fold increase in the luminosity may be achieved for 0.026% addition of the complex, which corresponds to 75 ppm iridium metal on a molar basis.

Figure 9:
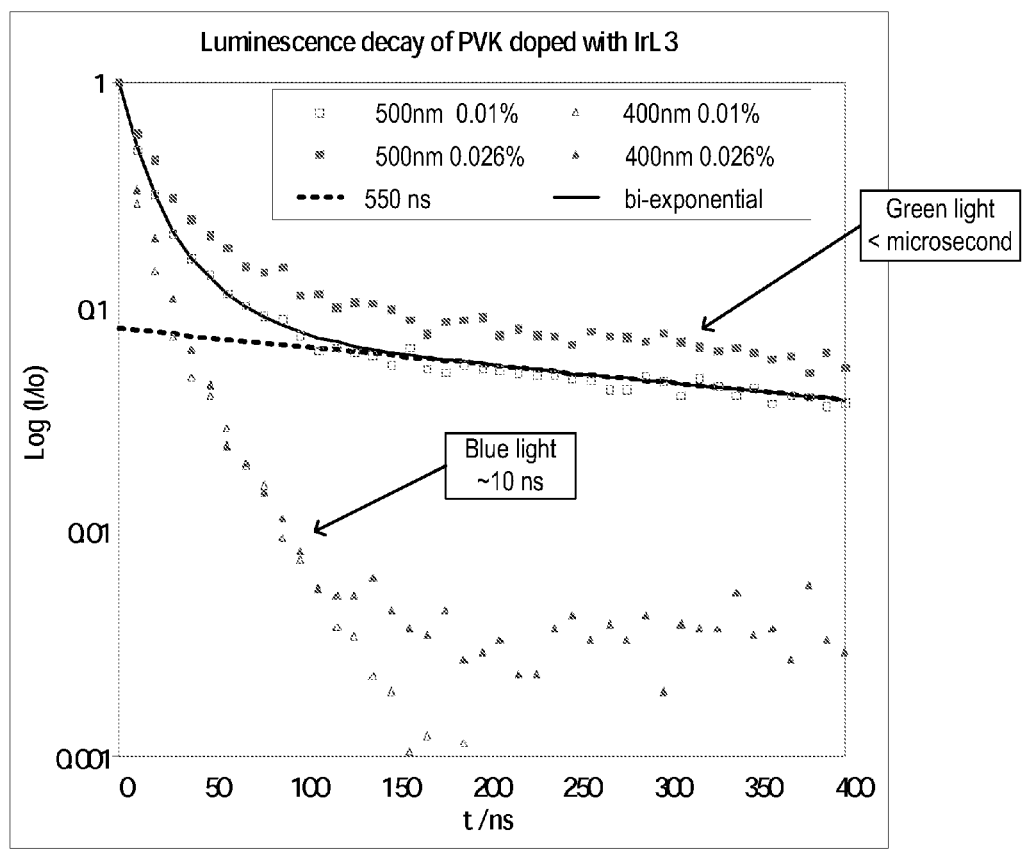
FIG. 9 is an example plot of timing characteristics of the intrinsic and extrinsic components of some doped host materials.

FIG. 9 is an example plot of timing characteristics of the intrinsic and extrinsic components of some doped host materials. The timing characteristics were determined by time correlated single photon counting (TCSPC) using PL excitation at 337 nm. Using a fast Si photodetector to generate a start pulse from the N$_2$ laser, and band bass filters centered on 410 and 520 nm to select the emission wavelengths, the delay times for single photons detected by a poorly coupled PMT were recorded. The timing distributions thus determined are shown in FIG. 9. The decay curves are very similar for the two doping levels used, showing fast fluorescence from the host PVK, which fits to a double exponential, (0.91 EXP[–t/10 ns]+0.09 EXP[–t/40 ns]), and single exponential (1.0 EXP[–t/550 ns]) for the extrinsic luminescence.

Figure 10:
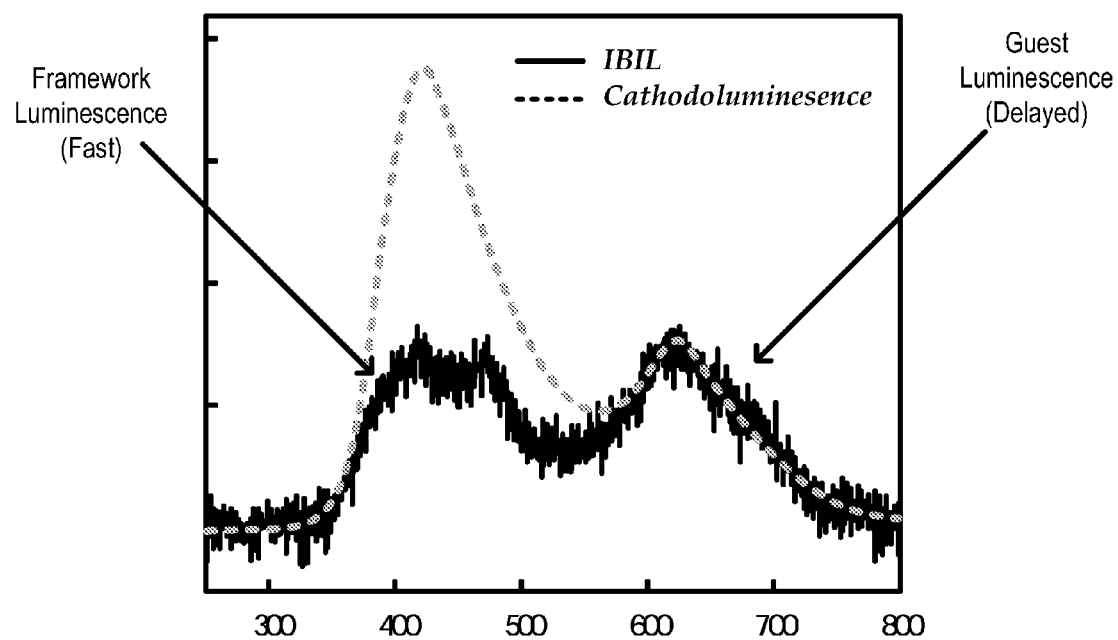
FIG. 10 is an example plot of radioluminescence in a doped MOF host material.

FIG. 10 is an example plot of radioluminescence in a doped MOF host material. The plot of FIG. 10 was taken from an example of MOF composite category 2 (referring to Table 1, above), doped by solvent infiltration of the phosphorescent complex. FIG. 10 illustrates IBIL (ion beam induced luminescence), which may be equated with fast protons, and CL (cathodoluminescence), which may be equated with electrons. The host material, IRMOF-10, comprises fluorescent biphenyl-dicarboxylate linkers in a cubic framework with pores large enough to accommodate the Ir(quin)$_3$ complex. As was seen for the PVK doped with Ir(ppy)$_3$ above, separable spectral features are observed, and fast fluorescence is quenched to a greater extent than the delayed extrinsic phosphorescence under high dE/dx excitation.

Figure 11:
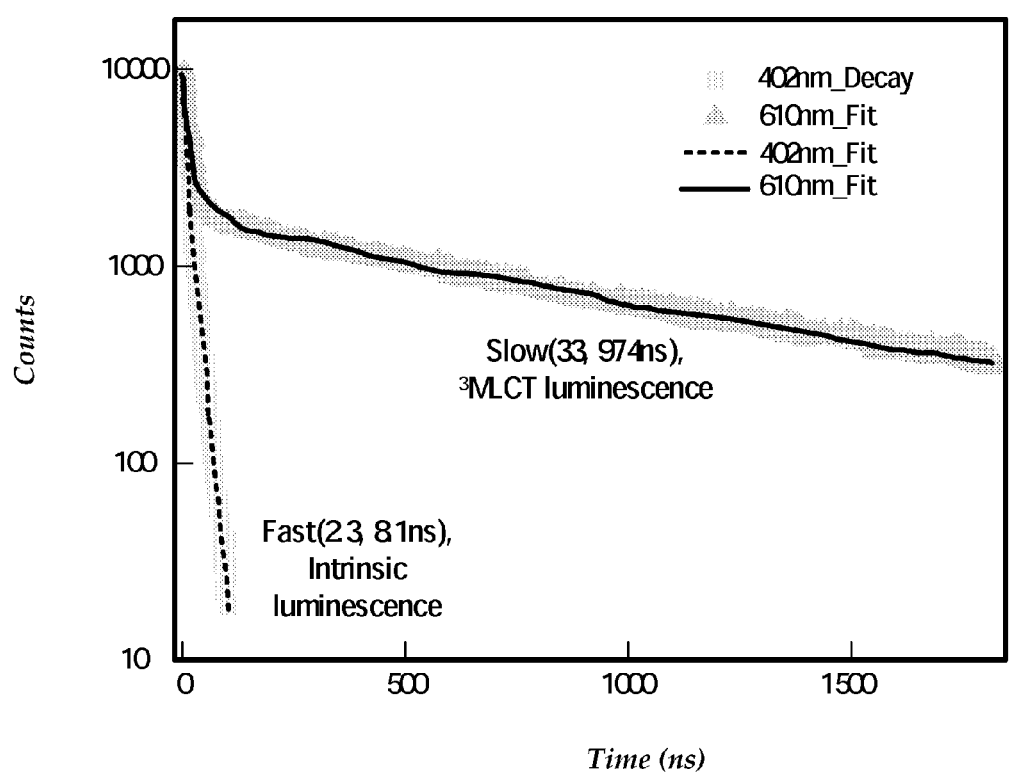
FIG. 11 is an example timing distributions for the emission features of FIG. 10.

FIG. 11 is an example timing distributions for the emission features of FIG. 10. Again, as with the polymer described above, the intrinsic signal is several orders of magnitude faster than the extrinsic phosphorescence of the complex, which may enable efficient pulse shape discrimination of neutrons and gammas. Note that the emission wavelengths of linkers and dopants may be arbitrarily chosen to observe separation of the spectral features, for unambiguous identification of the radiative transitions. Optimal materials for SSD and PSD may have emissions matched to efficient photon detectors such as PMTs.

The plots shown in FIGS. 8-11 are provided by way of example only and are not intended to limit embodiments of the present invention.

Embodiments of doped host materials and methods for doping host materials have accordingly been described above. Doped host materials according to embodiments of the present invention may advantageously produce delayed luminescence that is dependent on the type and quantity of luminophore. The delayed luminescence may occur at a different wavelength than the fast, singlet luminescence. Embodiments of systems and methods for particle detection according to embodiments of the present invention will now be further described. The term detection used herein encompasses both absolute detection of a particle using the host materials and discrimination between particles using the host materials. Embodiments of the present invention include pulse shape discrimination, using a temporal response of luminescence and spectral shape discrimination, using a emission spectrum of luminescence.

Figure 12:
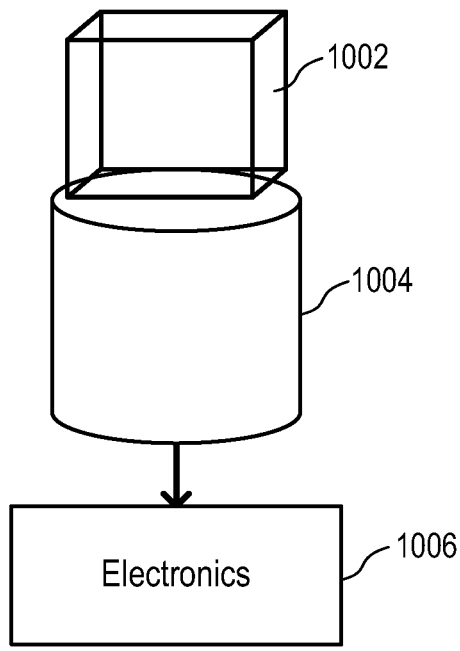
FIG. 12 is a schematic illustration of a scintillator system configured to perform pulse shape discrimination (PSD) in accordance with embodiments of the present invention.

FIG. 12 is a schematic illustration of a system 1010 configured to perform pulse shape discrimination (PSD). A photomultiplier tube (PMT) 1004 is positioned to receive luminescence generated by a doped host material 1002. PMT 1004 generally may convert the luminescence to an electronic signal. Electronics 1006 may be coupled to the PMT 1004 and receive the electronic signal generated by the PMT 1004. The electronics 1006 may be configured to detect particles and/or discriminate between particle types based on the temporal signature of the luminescence generated by the doped host material 1002. The doped host material 1002 includes a quantity of extrinsic dopant configured to harvest excited triplet states. Accordingly, delayed luminescence from triplet states may be greater than previous systems, and the detection performed by the electronics 1006 may be enhanced. Any suitable electronics, figures of merit, and detection methodologies for pulse shape discrimination may be used.

Embodiments of the present invention may perform spectral shape discrimination, which may differ from pulse shape discrimination in that it utilizes a difference in wavelength, in addition to or instead of, a difference in timing information to discriminate between particles.

Figure 13:
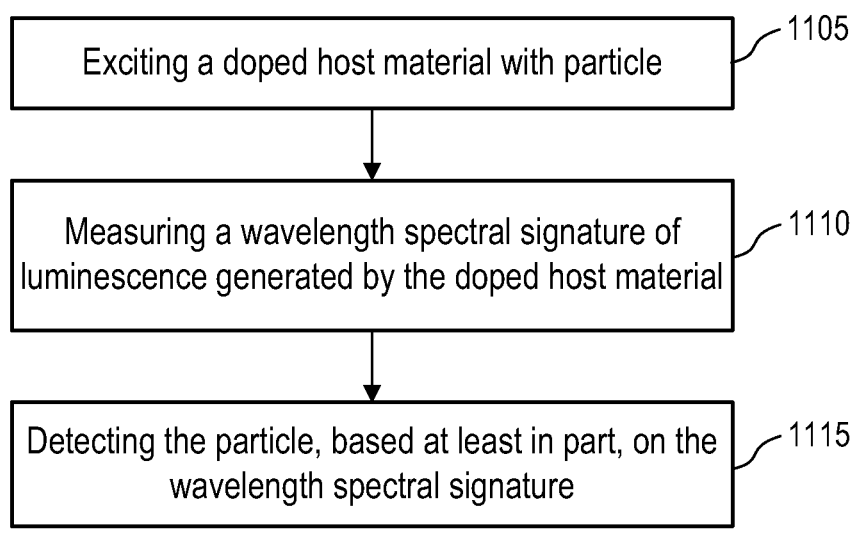
FIG. 13 is a flow diagram illustrating a method for performing spectral shape discrimination (SSD) according to embodiments of the present invention.

FIG. 13 is a flow diagram illustrating a method for performing spectral shape discrimination (SSD) according to embodiments of the present invention. The method 1100 may include blocks 1105, 1110, and/or 1115. In the block 1105, a doped host material may be excited with a particle. The block 1105 may be followed by the block 1110 in which a wavelength spectral signature of the luminescence generated by the host material may be measured. The wavelength spectral signature may include, for example, an intensity of luminescence at a plurality of wavelengths. The block 1110 may be followed by the block 1115 in which the particle may be detected, based at least in part, on the wavelength spectral signature. The particle may be detected by analyzing the wavelength spectral signature alone or with reference to the wavelength spectral signature of another particle.

In block 1105, a doped host material may be excited with a particle. A variety of particles may be detected in accordance with embodiments of the present invention, including but not limited to protons, neutrons, gamma rays, and electrons. Embodiments of the present invention may discriminate, for example, between neutrons and gamma rays. The presence of various materials, such as radioactive materials such as plutonium, may be detected based on the detection of particles described herein. Responsive to the excitation, excited singlet and triplet states may be generated in the host material. As has been described above, extrinsic dopant in the host material may facilitate the generation of luminescence from the excited triplet states. This luminescence from excited triplet states may occur at a different time and/or a different wavelength from the fluorescence generated due to excited singlet states.

In block 1110, a wavelength spectral signature of luminescence generated by the doped host material may be measured. For example, as will be described further below, one or more filters and/or photomultiplier tubes may be used to measure luminescence intensity at a plurality of wavelengths. The wavelength spectral signature may include luminescence intensity at a plurality of wavelengths. In some examples, a continuous measurement of luminescence intensity across a range of wavelengths may be taken. In other examples, luminescence intensity at discrete wavelengths may be measured. The measurement may include a wavelength of luminescence generated primarily by excited singlet states a different wavelength of luminescence generated primarily by excited triplet states.

In block 1115, the particle may be detected based at least in part on the wavelength spectral signature. For example, a particle may be detected based on a ratio of intensities at different wavelengths. Other characteristics of the wavelength spectral signature may be used to detect the particle. In some examples, luminescence intensity may be integrated across wavelength, and a figure of merit used to discriminate one particle type from another.

Figure 14:
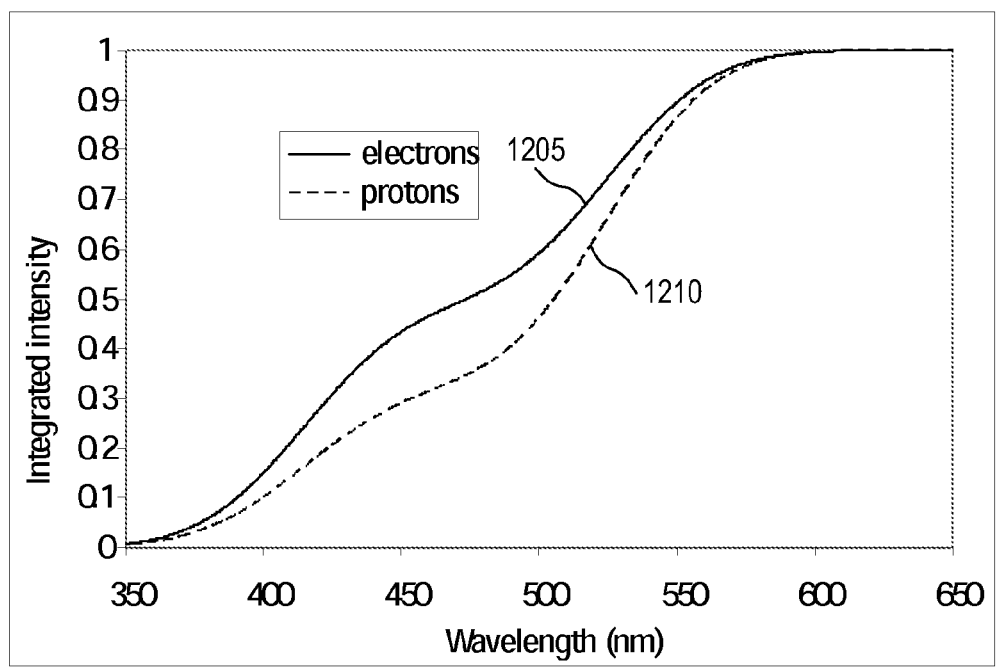
FIG. 14 is a schematic illustration of integrated luminescence intensity across wavelength generated by a doped host material in accordance with embodiments of the present invention.

FIG. 14 is a schematic illustration of integrated luminescence intensity across wavelength generated by a doped host material in accordance with an embodiment of the present invention. The integrated intensities shown in FIG. 14 may be obtained from the fits shown in FIGS. 6 and 7. The fits may be integrated an normalized to obtain cumulative probability distribution functions (CDFs) for the two types of events (e.g. proton or gamma ray). Integrated intensity generated by electrons is shown by line 1205 while integrated intensity generated by protons is shown by line 1210. As can be seen in FIG. 14, due to the larger proportion of triplet luminescence in the case of protons (recall the singlet quenching illustrated in FIGS. 8 and 9), the integrated luminescence due to protons 1210 increases more slowly than that from electrons 1205. Accordingly, a threshold wavelength may be selected, such as a wavelength between approximately 450 nm and 480 nm in FIG. 14. At the threshold wavelength, if the integrated intensity had not reached a threshold level, the particle may be identified as a proton, while if the integrated intensity had equaled or exceeded a threshold level, the particle may be identified as an electron. Thus, a threshold wavelength located between the wavelength of fluorescent emission by singlet states and the wavelength of fluorescent emission by triplet states, may be used as part of a figure of merit for detecting a particular particle.

Any of a variety of computational techniques may be used to gather and process spectral data and perform spectral shape discrimination. A spectral shape discrimination figure of merit, SSD, may be defined in an analogous manner to that of the pulse shape discrimination figure of merit, PSD. Experimental determination of PSD has been described, for example, in Donald L. Horrocks, "Pulse Shape Discrimination with Organic Liquid Scintillator Solutions," *Applied Spectroscopy* 24(4), 397 (1970), which article is hereby incorporated herein by reference in its entirety for any purpose. Instead of a timing threshold to bin events as used in PSD, a dichroic wavelength may be used. To experimentally determine an SSD figure of merit, experimental spectra may be fit, the fits integrated and normalized to obtain CDFs for the two types of events (e.g. proton or gamma ray). These CDFs may be used to randomly generate pulses of different sizes corresponding to photons detected for each kind of event.

Figure 15:
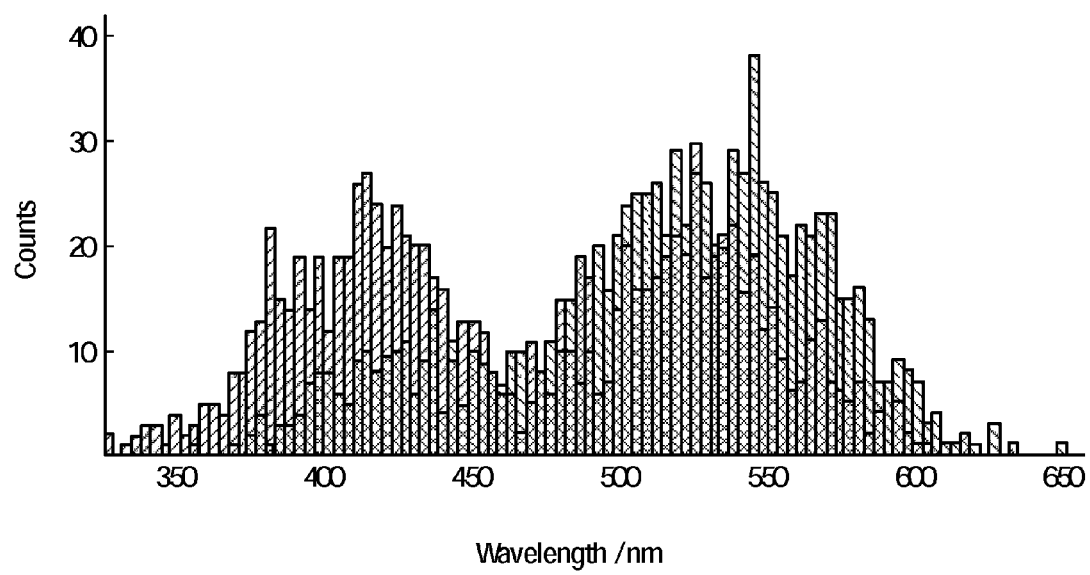
FIG. 15 is an example histogram showing two simulated 1000-photon pulses from doped PVK.
Figure 16:
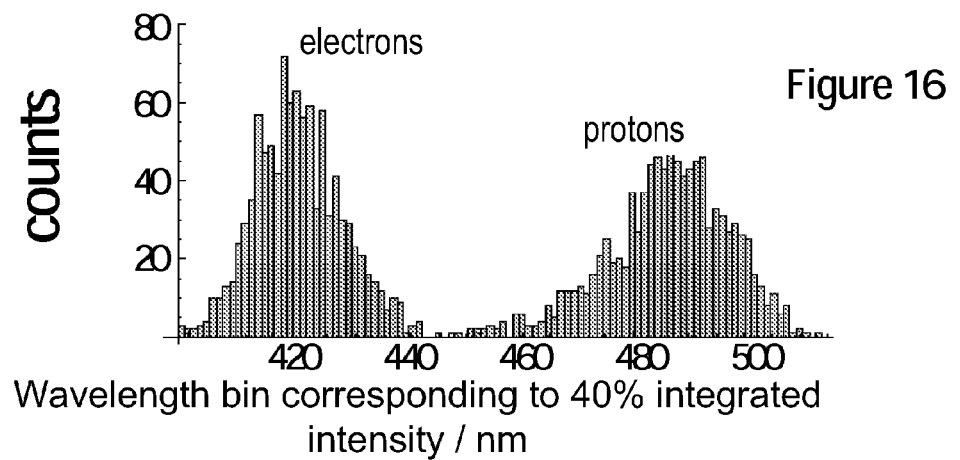
FIG. 16 is a histogram of counts over wavelength showing a wavelength bin at to 40% integrated intensity for electrons and protons, corresponding to a dichroic wavelength of 450 nm.
Figure 17:
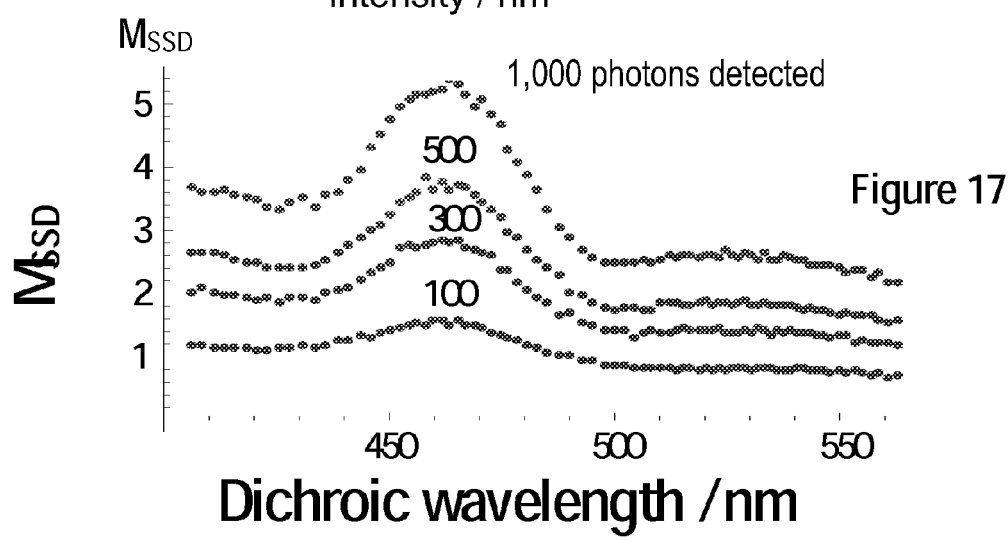
FIG. 17 is a plot of the figure of merit $M_{SSD}$ calculated as a function of dichroic wavelength, for different numbers of photons detected.

FIG. 15 is an example histogram showing two simulated 1000-photon pulses from doped PVK. A count of photons detected at each wavelength is shown. Simulated SSD pulses may be numerically integrated with respect to wavelength. In this manner, an optimum dichroic wavelength may be identified. FIG. 16 is a histogram of counts over wavelength showing a wavelength bin corresponding to 40% integrated intensity for electrons and protons, corresponding to a dichroic wavelength of 450 nm, referred to the CDFs of FIG. 14. The figure of merit SSD may be defined as a difference in the means of the distributions divided by the sum of their FWHMs. FIG. 17 is a plot of the figure of merit $M_{SSD}$ calculated in this manner as a function of dichroic wavelength, for different numbers of photons detected. The optimal dichroic wavelength from FIG. 17 may be seen to be 465 nm. The plots of FIG. 15-17 are examples based on excitation of PVK with 0.026% Ir(ppy)$_3$. Similar techniques may be used on data from other materials described herein.

Figure 18:
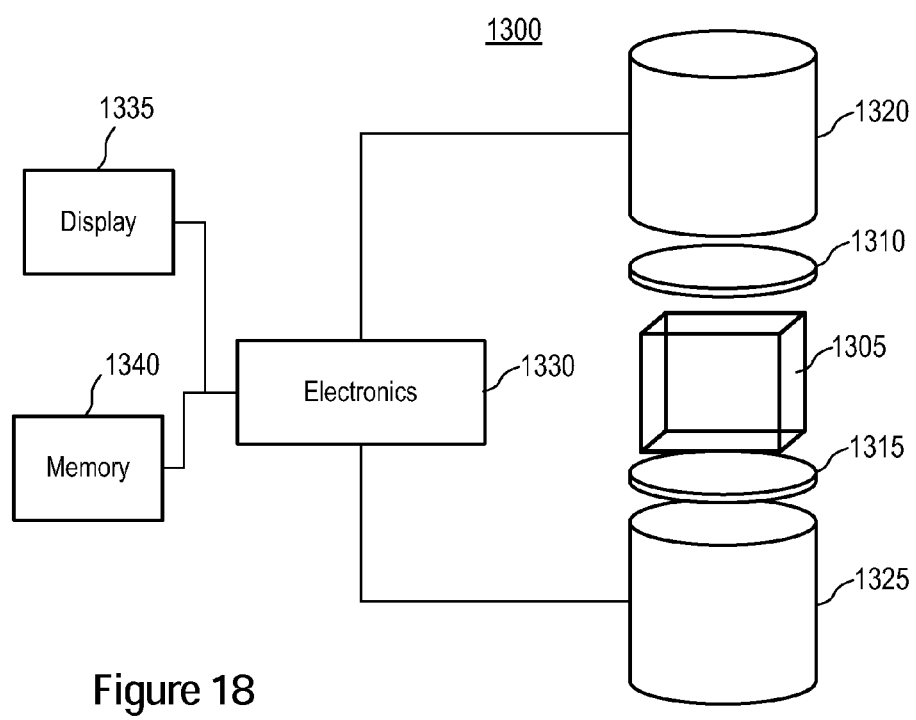
FIG. 18 is a schematic illustration of a scintillator system configured to perform spectral shape discrimination according to an embodiment of the present invention.

FIG. 18 is a schematic illustration of a scintillator system configured to perform spectral shape discrimination according to an embodiment of the present invention. The scintillator system 1300 includes a doped scintillator material 1305, two optical filters 1310 and 1315, and two photomultiplier tubes 1320 and 1325. As has been described above, the doped host material 1305 may be configured to generate fluorescence at one wavelength due to excited singlet states and to generate delayed luminescence at another wavelength due to excited triplet states. In one example, the excited singlet fluorescence may be blue light while the excited triplet luminescence may be green light.

The filter 1310 may be configured to filter out the fluorescence generated by the excited singlet states, and pass luminescence generated by the excited triplet states to the photomultiplier tube 1320. Accordingly, the filter 1310 may reflect one or more wavelengths around the wavelength of luminescence generated by the doped host material 1305 responsive to excited singlet states, such as blue light as described above. The filter 1315 may be configured to filter out the luminescence generated by the excited triplet states, and pass fluorescence generated by the excited singlet states to the photomultiplier tube 1325. Accordingly, the filter 1315 may reflect one or more wavelengths around the wavelength of luminescence generated by the doped host material 1305 responsive to excited triplet states, such as green light described above.

The photomultiplier tubes 1320 and 1325 are configured to generate an electronic signal based on the received luminescence and provide the electronic signal to associated electronics 1330. Thus, the photomultiplier tube 1320 may generate an electronic signal indicative of luminescence generated by excited triplet states while the photomultiplier tube 1325 may generate an electronic signal indicative of fluorescence generated by excited singlet states. The electronics 1330 may include a controller, processor, and/or other processing device configured to detect a particle based in part on signals received from the photomultiplier tubes 1320 and 1325. In some examples, the electronics 1330 may include memory or other storage for storing threshold values or other parameters, and the electronics 1330 may be configured to compare the one or more of the received signals with threshold values.

The electronics 1330, including one or more processing devices, may generate a signal indicative of the detection of a particle, and the signal may be displayed on a display device 1335 and/or stored in a memory 1340.

The system 1300 of FIG. 18 is an example of a system configured to perform spectral shape discrimination (SSD) according to an embodiment of the present invention. Other components may also be used in other examples of scintillator systems. For example, dichroic filters, wavelength dispersive optics, multilayer or tandem detectors, and/or photodiode arrays may be used in embodiments of detection systems to sense luminescence emitted in different spectral regions.

From the foregoing it will be appreciated that, although specific embodiments of the invention have been described herein for purposes of illustration, various modifications may be made without deviating from the spirit and scope of the invention.

What is claimed is:

1. A method of making a material for particle detection, the method comprising:
    providing a host material, wherein the host material is configured to generate excited singlet and triplet states responsive to excitation; and
    doping the host material with a quantity of heavy atoms wherein the quantity of heavy atoms are configured to generate luminescence from at least a portion of the excited triplet states, and wherein the quantity is sufficient to generate detectable luminescence from the excited triplet states, and wherein the quantity is insufficient to quench substantially all luminescence from the excited singlet states
    wherein the host material is configured to generate luminescence from the excited singlet states at a first wavelength, and wherein the heavy atoms are configured to generate luminescence from the excited triplet states at a second wavelength, different from the first wavelength.

2. The method of claim 1, wherein the doping comprises mixing the quantity of heavy atoms with the host material to disperse the heavy atoms into the host material.

3. The method of claim 1, wherein the host material comprises a metal organic framework material and wherein the doping comprises synthesizing the metal organic framework material in the presence of the heavy atoms.

4. The method of claim 1, wherein the host material comprises a metal organic framework material and wherein the doping comprises infiltrating the metal organic framework with a solvent containing at least a portion of the quantity of heavy atoms.

5. The method of claim 1, wherein the heavy atoms are selected from a group consisting of iridium atoms, platinum atoms, osmium atoms, and combinations thereof.

6. A material for particle detection, the material comprising:
    a host material;
    a first luminophore dispersed in the host material, wherein the first luminophore is configured to generate luminescence at a first wavelength responsive to excited singlet states; and
    a second luminophore dispersed in the host material, wherein the second luminophore is configured to generate luminescence at a second wavelength, different from the first wavelength, responsive to excited triplet states;
    wherein a quantity of the second luminophore is insufficient to quench substantially all luminescence at the first wavelength.

7. The material of claim 6, wherein the second luminophore comprises a heavy atom.

8. The material of claim 6, wherein first luminophore is intrinsic to the host material and the second luminophore comprises an extrinsic dopant.

9. The material of claim 6, wherein the first luminophore comprises an extrinsic dopant and the second luminophore is intrinsic to the host material.

10. The material of claim 6, wherein the first and second luminophores comprise extrinsic dopants.

11. The material of claim 6, wherein the host material is selected from a group consisting of crystalline materials, liquid materials, and plastic materials.

12. The method of claim 6, wherein the host material comprises PVK.

13. The method of claim 6, wherein the second luminophore is selected form a group consisting of iridium atoms, platinum atoms, osmium atoms, and combinations thereof.

14. A method for detecting a particle, the method comprising:
   exciting a material with the particle, wherein the material is configured to generate excited singlet and triplet states responsive to excitation by the particle, and wherein the material includes a luminophore configured to harvest luminescence from excited triplet states;
   measuring a temporal luminescence response generated by the material including a magnitude of luminescence at a plurality of times; and
   detecting the particle, based at least in part, on the temporal response.

15. The method of claim 14 wherein the particle comprises an energetic electron, proton or ion.

16. The method of claim 14 wherein the luminophore comprises a metal organic ligand.

17. The method of claim 14 wherein the temporal luminescence response comprises a first intensity of luminescence generated at a first time based primarily on excited singlet states and a second intensity of luminescence generated at a second time based primarily on excited triplet states facilitated by the luminophore.

18. The method of claim 14 wherein the temporal luminescence response comprises integrating luminescence generated by the material over time.

19. A method for detecting a particle, the method comprising:
   exciting a material with the particle, wherein the material is configured to generate states responsive to excitation by the particle, and wherein the material includes a luminophore configured to facilitate luminescence from excited triplet states responsive to exposure to the excited triplet states in the material;
   measuring a wavelength spectral signature of luminescence generated by the material including a magnitude of luminescence at a plurality of wavelengths; and
   detecting the particle, based at least in part, on the wavelength spectral signature.

20. The method of claim 19, wherein the material is configured to generate luminescence from the excited singlet states at a first wavelength, and wherein the luminophore is further configured to generate luminescence from the excited triplet states at a second wavelength, different from the first wavelength; and wherein the spectral signature includes luminescence at the first and second wavelengths.

21. The method of claim 19, wherein the particle comprises an electron or a proton.

22. The method of claim 19, wherein the luminophore comprises a metal-organic complex.

23. The method of claim 19, wherein the spectral response comprises an integral of luminescence generated by the material over a plurality of wavelengths.

24. A system comprising:
   a material, wherein the material is configured to generate excited singlet and triplet states responsive to excitation by a particle, and wherein the material includes a luminophore configured to luminescence responsive to exposure to excited triplet states in the material, and wherein the material is further configured to generate luminescence from the excited singlet states at a first wavelength, and wherein the luminophore is further configured to generate luminescence from the excited triplet states at a second wavelength, different from the first wavelength;
   a first luminescence detector configured to receive at least a portion of luminescence generated by the material and further configured to generate a first signal corresponding to a magnitude of luminescence at the first wavelength; and
   a second luminescence detector configured to receive at least a portion of luminescence generated by the material and further configured to generate a second signal corresponding to a magnitude of luminescence at the second wavelength.

25. The system of claim 24, further comprising:
   a first filter disposed between the material and the first luminescence detector and configured to provide luminescence at the first wavelength to the first luminescence detector and block luminescence at the second wavelength; and
   a second filter disposed between the material and the second luminescence detector and configured to provide luminescence at the second wavelength to the second luminescence detector and block luminescence at the first wavelength.

26. The system of claim 24, further comprising a processing device coupled to the first and second luminescence detectors and configured to receive the first and second signals, wherein the processing device is further configured to detect a particle based, at least in part, on the first and second signals.

27. The system of claim 24, wherein the particle comprises an energetic electron, proton or ion.

28. The system of claim 24, wherein the luminophore comprises a metal-organic complex.

* * * * *